US008161555B2

(12) United States Patent
Spatscheck et al.

(10) Patent No.: US 8,161,555 B2
(45) Date of Patent: Apr. 17, 2012

(54) PROGRESSIVE WIRETAP

(75) Inventors: Oliver Spatscheck, Randolph, NJ (US); Jacobus Van der Merwe, New Providence, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1194 days.

(21) Appl. No.: 11/239,754

(22) Filed: Sep. 30, 2005

(65) Prior Publication Data
US 2011/0030054 A1 Feb. 3, 2011

Related U.S. Application Data

(60) Provisional application No. 60/694,656, filed on Jun. 28, 2005.

(51) Int. Cl.
G06F 11/00 (2006.01)
G06F 12/14 (2006.01)

(52) U.S. Cl. ............... 726/23; 713/152; 713/168; 726/2

(58) Field of Classification Search .............. 370/389, 370/386, 384, 232, 252, 229; 713/151, 188, 713/153, 182, 154; 726/3, 22, 23, 24, 2
See application file for complete search history.

(56) References Cited

U.S. PATENT DOCUMENTS

| | | | | |
|---|---|---|---|---|
| 7,069,316 B1 * | 6/2006 | Gryaznov | ..................... | 709/224 |
| 7,225,270 B2 * | 5/2007 | Barr et al. | ..................... | 709/238 |
| 7,584,503 B1 * | 9/2009 | Palmer et al. | ..................... | 726/9 |
| 2002/0083175 A1 * | 6/2002 | Afek et al. | ..................... | 709/225 |
| 2003/0016664 A1 * | 1/2003 | MeLampy et al. | ............ | 370/389 |
| 2003/0046577 A1 * | 3/2003 | Silverman | ..................... | 713/200 |
| 2005/0044208 A1 | 2/2005 | Jones et al. | | |
| 2005/0050364 A1 * | 3/2005 | Feng | ............................. | 713/201 |
| 2005/0180416 A1 * | 8/2005 | Jayawardena et al. | ........ | 370/389 |
| 2005/0278779 A1 * | 12/2005 | Koppol et al. | ................... | 726/22 |

OTHER PUBLICATIONS

"DDos and Traceback", CS 6262 Spring 02—Lecture #4.*
DDos/Traceback-Characterization, Ozgur Ozturk, Paper #3, Feb. 25, 2002.*
Security (2): IP Traceback, Suguru Yamaguchi, Wayback machine, Mar. 9, 2003.*
Henry C.J. Lee, Vrizlynn L.L. Thing, Yi Xu, and Miao Ma; "ICMP Traceback with Cumulative Path, an Efficient Solution for IP Traceback", ICICS 2003.*
European Patent Office Search Report for Corresponding European Patent Application No. 06114563.7-2413.
Bellovin, Steven et al., "ICMP Traceback Messages", Internet Draft, IETF (Feb. 2003).
Michael Glenn, "A summary of DoS/DDoS Prevention, Monitoring and Mitigation Techniques in a Service Provider Environment", SANS Institute, Aug. 21, 2003,http://www.sans.org/reading_room/whitepapers/intrusion/1212.php on Jul. 13, 2006.
"DDoS and Traceback", 2003, Downloaded from http://www.cc.gatech.edu/classes/AY2003/cs6262_spring/ddos_traceback.ppt on Jul. 13, 2006.

* cited by examiner

*Primary Examiner* — Taghi Arani
*Assistant Examiner* — Mohammad Rahman

(57) ABSTRACT

Disclosed is a method and system for identifying a controller of a first computer transmitting a network attack to an attacked computer. To identify an attacker implementing the attack on the attacked computer, the present invention traces the attack back to the controller one hop at a time. The invention examines traces of the attacked computer to identify the first computer. Traffic transmitted to the first computer is redirected through a monitoring complex before being transmitted to the first computer. The controller is then detected from traffic monitoring by the monitoring complex.

9 Claims, 2 Drawing Sheets

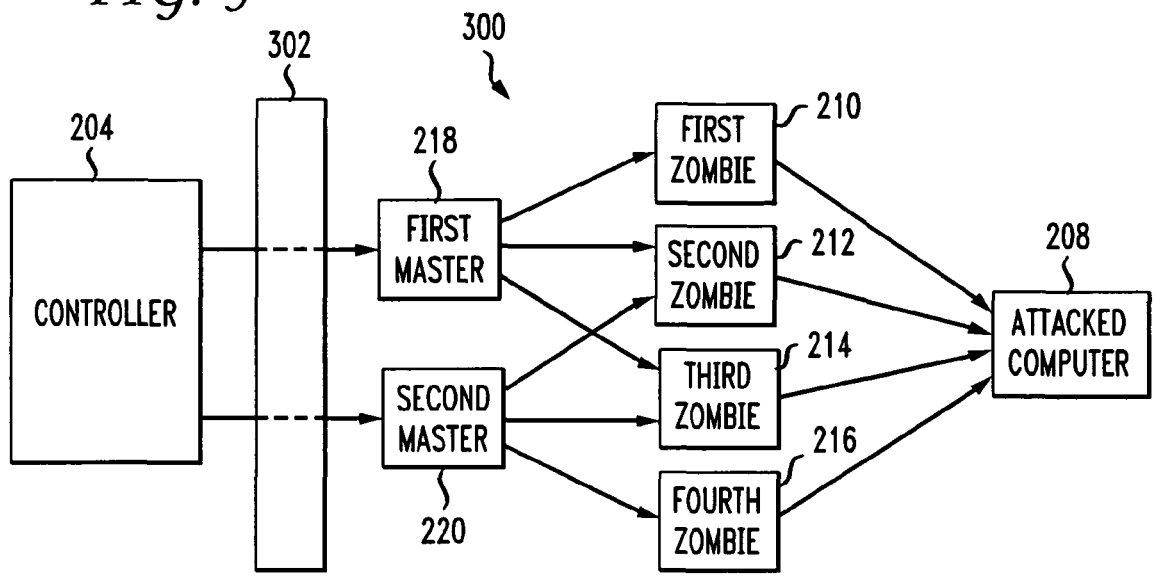
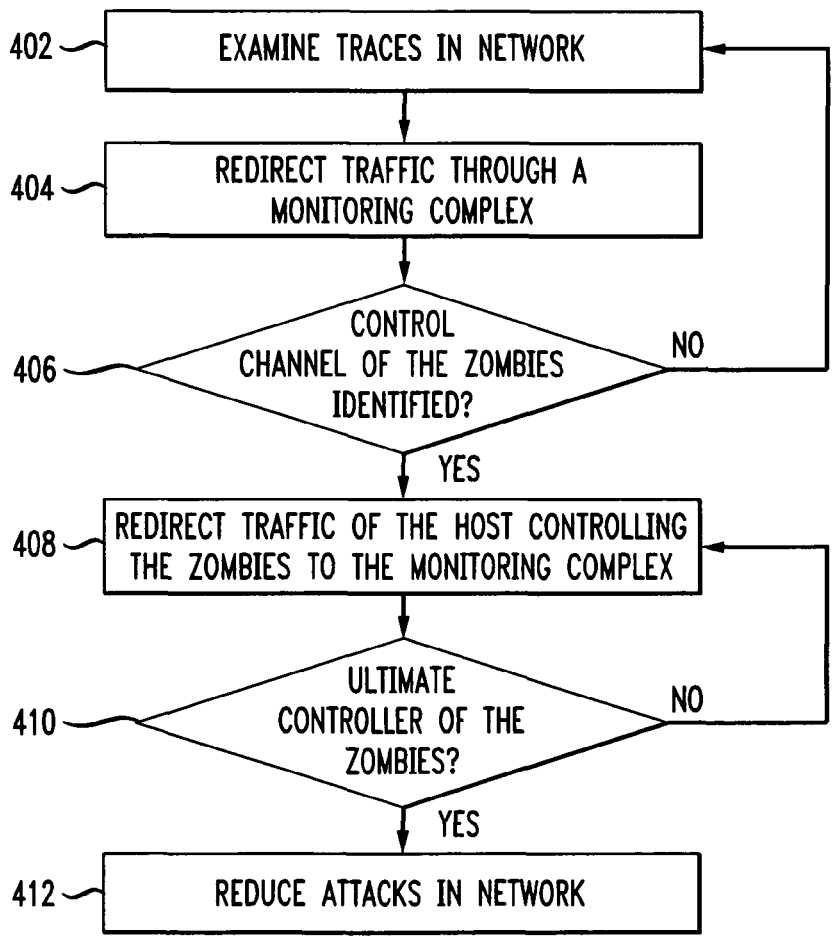

PROGRESSIVE WIRETAP

This application claims the benefit of U.S. Provisional Application No. 60/694,656 filed Jun. 28, 2005, which is incorporated herein by reference.

BACKGROUND OF THE INVENTION

The present invention relates generally to network security, and more particularly to identifying the source of a network attack.

As the Internet has grown, the benefits associated with the Internet have also increased greatly. People can stream continuous audio and video (e.g., listen to Internet radio stations, watch news videos, etc.), play on-line games, download movies and music, share pictures with friends and family, and collaborate with co-workers all over the world.

Because of the growth of the Internet, the traffic communicated over the Internet is enormous. In particular, today's Internet traffic is more than 10 petabytes per day. Hundreds of terabytes of storage are typically needed to store one day of traffic flow records.

Due to the sheer volume of traffic over the Internet, network security personnel often find it extremely difficult to identify the source of a network attack. Many network attacks are controlled by a small amount of traffic sent by an attacker via multiple compromised hosts to hosts which perform the attack.

In more detail, a hacker typically uses a controller computer to write a program called a daemon. A daemon is a program that is implanted on a computer and puts the computer under the control of the hacker without the knowledge of the computer user. The daemon executes in the background unknowing to the computer user and "steals" the computer's resources. A controlling computer (also referred to below as a controller) transmits this daemon to one or more zombie computers via an attachment or over a network. A zombie computer is a typical computer that is under the control of another computer (e.g., the controller). When the daemon arrives at the zombie computer, the daemon executes in the background without the user of the zombie computer noticing any change.

To convert a computer to a zombie computer, the hacker performs several steps. Computers connected to the internet have thousands of ports that work like doors for network services. For example, mail typically travels through port 25 and website data typically travels through port 80. Only a few of these "doors" are open at a time, depending on what kind of data a computer accepts. The hacker, trying to convert a computer to a zombie, executes a "port scanner" that sends messages to all possible ports of the computer to see which ones are open and accept information, and what kind of computer it is.

Many programs that accept data have flaws. The hacker (also referred to below as an attacker) uses a toolkit of different programs to identify these flaws on available ports. If a flaw is available, the hacker can inject the daemon into the computer. When the hacker logs off of a computer, the daemon uses its own toolkit to find a flaw in yet another computer. If the daemon finds a flaw, the daemon can then install another daemon on another computer. The daemons then work together and launch a distributed denial of service (DDoS) attack, flooding a targeted computer with packets in an attempt to cripple the computer's operation.

Tracing the traffic flow over the Internet may provide some insight into who the controller is. Tracing the traffic flow back to the real hacker who is responsible for and controls an attack is, however, often quite difficult, especially when the attack occurs over a large scale network like the Internet. As described above, to collect, store, and analyze the traffic flow for even a single day is typically unmanageable and expensive. On the other hand, if the traffic is stored for a shorter period of time, then a hacker can issue attack commands for future attacks sufficiently in advance as to not be traceable. Further, as the number of daemons increases, more computers are involved in the attack. As a result, the hacker is harder to trace.

Therefore, there remains a need to accurately identify who an attacker is when a DDoS attack on a computer system occurs over the Internet.

BRIEF SUMMARY OF THE INVENTION

The present invention is a method and system for identifying a controller of a first computer that transmits a network attack to an attacked computer. In order to identify an attacker implementing a network attack on one or more computers, the system traces the attack back to the controller one hop at a time. The system examines traces of the attacked computer to identify the first computer. Traffic transmitted to the first computer is redirected through a monitoring complex before being transmitted to the first computer. The controller is then detected from traffic monitoring by the monitoring complex.

The system collects traces from the network or from the attacked computer. The monitoring complex can store application level traces of traffic transmitted to the first computer. When the controller is detected, the controller may be disabled.

The controller communicates an attack command to a second computer. The second computer then communicates the attack command to the first computer over a control channel. The communication from the second computer may be redirected to the monitoring complex.

To detect the computer or controller, the present invention can examine, in an Internet Protocol (IP) network, the source IP address to detect the source of the transmission. In a MultiProtocol Label Switching (MPLS) network, the present invention can detect an MPLS label on the packets to detect the source of the transmission. This can lead to the detection of the controller, first computer, or second computer.

These and other advantages of the invention will be apparent to those of ordinary skill in the art by reference to the following detailed description and the accompanying drawings.

BRIEF DESCRIPTION OF THE DRAWINGS

FIG. 3 shows a block diagram of network corresponding to the network of FIG. 1 in which the packets sent to each master computer are redirected to monitoring complex before being sent to each master computer; and FIG. 4 is a flowchart showing the steps performed by an ISP node to locate the controller.

DETAILED DESCRIPTION

A distributed denial of service (DDoS) attack typically cripples a targeted computer. Often, the DDoS attack is implemented by so-called "zombie" computers under the control of another controlling computer. To determine which computer is the controlling computer (i.e., the controller) controlling the zombie computers is a challenging and often unsuccessful endeavor.

As described above, a hacker (or attacker) typically uses a controller computer to write a program called a daemon. The daemon executes in the background unknowing to the computer user and "steals" the computer's resources. A controller transmits this daemon to one or more zombie computers via an attachment or over a network.

Figure 1:
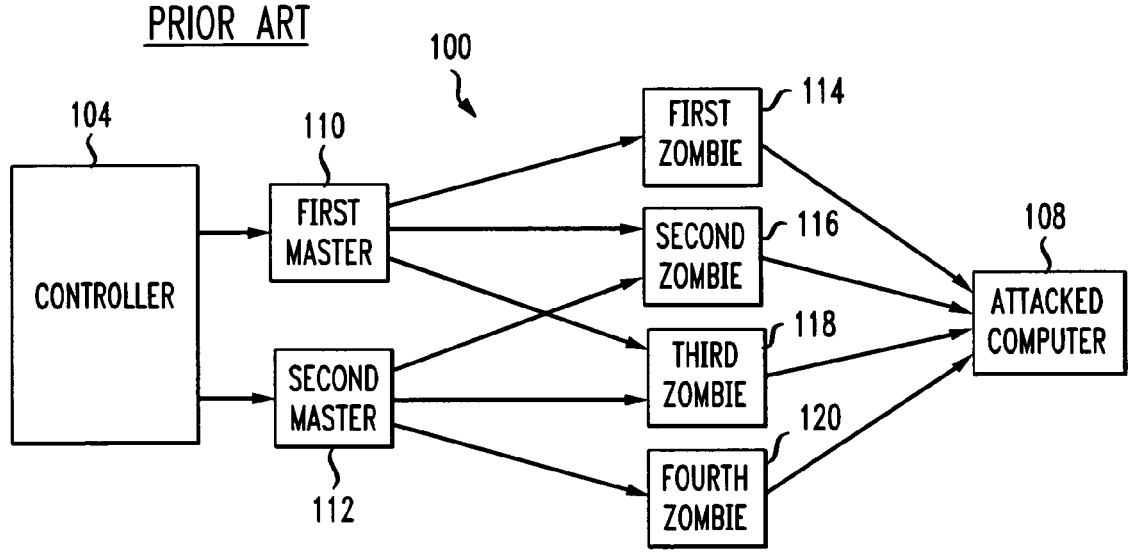
FIG. 1 shows a prior art network having a controller implementing a distributed denial of service (DDoS) attack on a computer.

FIG. 1 shows a prior art network 100 having a controller 104 implementing a distributed denial of service (DDoS) attack on computer 108. The controller 104 first compromises a set of master computers (also referred to as hosts), such as a first master computer 110 and a second master computer 112 (e.g., using vulnerability scanners). The master computers 110, 112 are computers that the controller 104 uses to start the attack. Each master computer 110, 112 communicates with one or more zombie computers. The master and zombie computers are typical computers executing typical software applications.

In FIG. 1, the first master computer 110 communicates with a first zombie computer 114, a second zombie computer 116, and a third zombie computer 118. The second master computer 112 communicates with the second zombie computer 116, the third zombie computer 118, and a fourth zombie computer 120. Each master computer 110, 112 controls the zombie computers 114-120 that the master computer 110, 112 communicates with. Thus, the controller 104 orders the daemons installed on the zombie computers 114-120 to perform a DDoS attack on the attacked computer 108 via the corresponding master computer 110, 112. As described, there are two phases to a network attack—the formation of the attack network and then, at a later point in time, the actual attack.

Although FIG. 1 is shown with two master computers and with four zombie computers, any number of master computers and zombie computers (in various configurations) may be under the control of the controller 104. Further, there are many different ways to construct an attack network, such as with an Internet Relay Chat (IRC) server.

The controller 104 then communicates with the master computers 110, 112 (either directly or through a chain of other hosts that the hacker has compromised) and orders the daemons to perform an attack by flooding the attacked computer 108 with packets. The controller 104 is difficult to detect because of the multiple hops taken by the controller 104 to implement the attack. The attack is implemented by zombie computers 114-120 and not by the actual controller 104. Thus, the determination that a DDoS attack was made from the second zombie computer 116 does not lead to the determination of the controller 104, the computer responsible for the attack.

Figure 2:
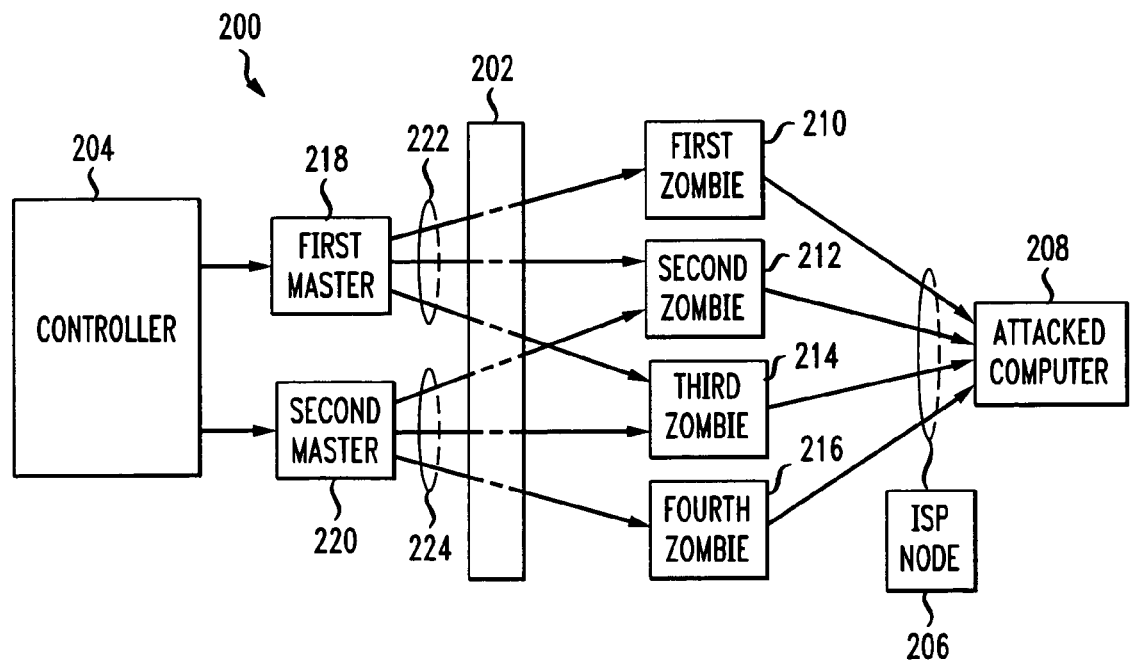
FIG. 2 shows a block diagram of a network corresponding to the network of FIG. 1 in which the packets sent to each zombie computer are redirected to a monitoring complex before being sent to each zombie computer.

FIG. 2 shows a block diagram of a network 200 corresponding to the network of FIG. 1 in which the packets sent to each zombie computer are redirected to a monitoring complex 202 before being sent to each zombie computer. FIG. 3 shows a block diagram of network 300 corresponding to the network of FIG. 1 in which the packets sent to each master computer are redirected to monitoring complex 302 before being sent to each master computer. FIG. 4 is a flowchart showing the steps performed by an ISP node to locate controller 204.

Although FIGS. 2 and 3 show two different monitoring complexes at two different positions, the present invention applies to any number of monitoring nodes (e.g., one, three, etc.). Further, FIGS. 2 and 3 illustrate a representation of the redirection of traffic through a monitoring complex 202, 302. It should be noted that the monitoring complex 202, 302 is not physically inserted in between the master computers and the zombie computers or in between the controller and the master computers. Instead, the traffic communicated between the master computers and the zombie computers is rerouted (i.e., redirected) to a monitoring complex 202, 302 before being transmitted to its original destination.

Further, the identification of controller 204 is an iterative process. The identification of controller 204 may occur during a single network attack or may occur over numerous network attacks (i.e., the same master computers and zombie computers are used by the controller to implement multiple attacks). Additionally, the identification of the controller 204 occurs when the communications between computers (e.g., between the controller 204 and the master computers) is "visible" by the ISP node (e.g., occurs within an ISP node's network or occurs within an ISP's network that cooperates with the ISP node's network).

Referring to FIG. 2 and FIG. 4, an ISP node 206 determines that a DDoS attack is occurring at the attacked computer 208 because the attacked computer 208 is being flooded with packets. In one embodiment, the owner of the attacked computer 208 calls the ISP and alerts the ISP that the attacked computer 208 is the subject of a DDoS attack. Alternatively, the ISP has monitoring boxes (or ISP nodes) at various points in the network to examine network packets and determine that a DDoS attack is occurring (e.g., at the attacked computer 208).

The ISP node 206 then collects and analyzes traces generated by the attacked computer 208 in step 402. A trace is defined as a log of executed instructions (e.g., executed by a computer or network device) or a log of packets sent and/or received by a computer/network device. The ISP node 206 examines the traces of the attacked computer 208 to determine what machine is sending the data to the attacked computer 208. The ISP node 206 can alternatively sample network-based traces to determine what machine(s) are sending the data to the attacked computer 208.

The ISP node 206 uses the traces to determine that the attack is being transmitted by first zombie computer 210, second zombie computer 212, third zombie computer 214, and fourth zombie computer 216. Once the computers that are transmitting the packets to the attacked computer 208 are determined, the ISP node 206 then redirects, in step 404, the traffic destined for the zombie computers through monitoring complex 202. The redirection occurs by the ISP node 206 advertising (to routers in the network) a more desirable route for traffic destined for the attacked computer 208. This more desirable route is through the monitoring complex 202. The redirection is transparent to the zombie computers 210-216 and the attacked computer 208 because the data is eventually transmitted (e.g., through a tunnel) to its original destination (e.g., zombie computers 210-216) after being transmitted through the monitoring complex 202.

The monitoring complex 202 stores (e.g., in a database) application level traces of all traffic destined for the zombie computers 210-216. Application level traces are traces associated with the transmitting of traffic to the zombie computers 210-216. The monitoring complex 202 then determines in step 406 whether the traffic going to the zombie computers 210-216 is from the control channel of the zombie computers 210-216. The control channel is the path to the zombie computers 210-216 used by the master computers to coordinate the zombie computers 210-216 to perform the attack. In FIG. 2, there are two control channels—a first control channel 222 between the first master computer 218 and the first, second, and third zombie computers 210-214 and a second control channel 224 between the second master computer 220 and the second, third, and fourth zombie computers 212-216.

For example, the monitoring complex 202 may determine that the zombie computers 210-216 are taking part in an Internet Relay Chat (IRC) through an IRC server. As an IRC server is responsible for making sure that IRC messages are broadcast to all of the devices (e.g., the first zombie computer 210) participating in a discussion over a particular channel (e.g., first channel 222), the monitoring complex 202 can determine the channel (e.g., the first channel 222) that the discussion is occurring over.

The monitoring complex 202 determines in step 406 that the communication channels 222, 224 are the control channels of the zombie computers 210-216. If the master computers 218, 220 were instead another layer of zombie computers, then the monitoring complex 202 would determine that the communication channels 222, 224 were not control channels. The monitoring complex 202 would then communicate this information back to the ISP node 206. The ISP node 206 then examines the traces associated with the zombie computers 210-216 in step 402. The trace examination and traffic redirection repeat themselves until the monitoring complex 202 identifies in step 406 the control channel of the zombie computers 210-216.

Referring to FIG. 3, once the control channel is identified, the ISP node 206 then redirects the traffic from the controller 204 to monitoring complex 302 before its destination of the master computers 218, 220 in step 408. The monitoring complex 302 then determines whether the controller 204 is the ultimate controller of the zombie computers in step 410. In one embodiment, the monitoring complex 302 makes this determination by examining the traffic (e.g., the commands) that the controller 204 transmits to the master computers 218, 220. In another embodiment, the traffic is encrypted. The monitoring complex 302 then determines where the traffic came from and where the traffic is going. For example, the monitoring complex 302 can determine that traffic from the controller 204 is destined for the zombie computers 210-216. The monitoring complex 302 can use this information to determine that the controller 204 is issuing commands to the zombie computers 210-216.

In this example, the monitoring complex 302 determines that the controller 204 is the ultimate controller of the zombie computers 214, 218. The ISP node 206 can then reduce attacks in the network 200 in step 412. In one embodiment, the ISP node 206 disables the controller 204. The ISP node 206 may also (or alternatively) inform law enforcement (e.g., the Federal Bureau of Investigation) about the controller 204. The ISP node 206 may additionally (or alternatively) inform the controller's ISP that the controller is the ultimate controller of a network attack.

The present invention is also effective even when the zombie computers 210-216, master computers 218, 220, and/or the controller 204 use Internet Protocol (IP) spoofing to hide their identity. IP spoofing occurs when an attacker hides their identity by using a source IP address of a trusted machine for their messages. This hiding often makes the tracing and stopping of the DDoS attack even more difficult because the source address used is not the actual source address of the transmitting machine.

A communication protocol often used to facilitate communications across network 200, 300 is the Multiprotocol Label Switching (MPLS) protocol. MPLS is a technology for speeding up network traffic flow. In particular, MPLS involves setting up a specific path for a given sequence of packets, identified by a label in each packet. Routers use the label to direct a packet to its next hop until it reaches its destination. This label saves a router the time conventionally needed to look up the address to the next node to forward the packet to. Multiple paths can be defined between two endpoints to provide load balancing and backup service in the event of a line failure.

When an attacker hides their identity with IP spoofing, the ISP node 206 (or monitoring complex 202, 302) uses network level data, such as MPLS routing information, to determine where the attack or control traffic entered the network. Thus, the ISP node 206 (or monitoring complex 202, 302) does not use the source address as part of the trace and instead uses the MPLS routing information (i.e., the packet label) to identify the attacker.

If the attacker decides to abandon the zombie network that the attacker took time to acquire because of the present invention, then the cost of an attack for the attacker and the time needed for each attack has increased substantially for the attacker. The attacker has to acquire new zombie computers before transmitting a new attack.

Although the ISP node 206 and the monitoring complex 202, 302 are described above as executing specific functions, they each may execute one or more of any of the functions described above. Further, the present invention may additionally be applied to traffic of a Virtual Private Network (VPN).

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for identifying a controller associated with a network attack of an attacked computer comprising:
   examining a first plurality of traces generated by a previously targeted computer to identify a first plurality of computers associated with the first plurality of traces;
   storing in a database data corresponding to the first plurality of traces and the first plurality of computers;
   examining a second plurality of traces generated by the attacked computer to identify a second plurality of computers associated with the second plurality of traces;
   identifying a third plurality of computers based on a comparison of the data and the second plurality of traces, where the third plurality of computers comprises at least one computer that is also one of the first plurality of computers and also one of the second plurality of computers;
   redirecting traffic being transmitted to the third plurality of computers transparently through a monitoring complex separate from the attacked computer, such that all traffic directed to each particular one of the third plurality of computers is transmitted through the monitoring complex to the particular one of the third plurality of computers to which the traffic was directed;
   identifying internet relay chat messages being transmitted via a control channel to each of the third plurality of computers, based on a response of the monitoring complex to the traffic;

redirecting the internet relay chat messages being transmitted via the control channel to each of the third plurality of computers transparently through the monitoring complex, such that the internet relay chat messages being transmitted via the control channel to each particular one of the third plurality of computers is transmitted through the monitoring complex to the particular one of the third plurality of computers to which the traffic was directed; and detecting the controller based on a MultiProtocol Label Switching label and a response of the monitoring complex to the internet relay chat messages.

2. The method of claim 1 further comprising collecting a fourth plurality of traces from the network.

3. The method of claim 1 further comprising collecting the second plurality of traces from the attacked computer.

4. The method of claim 1 wherein the monitoring complex stores application level traces of traffic transmitted to the plurality of computers.

5. The method of claim 1 further comprising disabling the controller.

6. The method of claim 1 wherein the examining traces of the attacked computer to identify the plurality of computers further comprises using a MultiProtocol Label Switching label to identify the plurality of computers.

7. The method of claim 1 wherein the detecting of the controller further comprises using a MultiProtocol Label Switching label to detect the controller.

8. A system for identifying a controller associated with a network attack to an attacked computer comprising:

a network node comprising a processor for examining traces of the attacked computer to identify a plurality of computers and for transparently redirecting traffic being transmitted to the plurality of computers through a monitoring complex separate from the attacked computer, such that all traffic directed to each particular computer of the plurality of computers is transmitted through the monitoring complex to the particular one of the plurality of computers to which the traffic was directed; and the monitoring complex comprising:

a monitoring node comprising a processor, the monitoring node configured to identify internet relay chat messages being transmitted via a control channel to each of the plurality of computers, based on a response of the monitoring node to the traffic, and the monitoring node configured to redirect the internet relay chat messages being transmitted via the control channel to each of the plurality of computers transparently through the monitoring node, such that the internet relay chat messages being transmitted to each particular one of the plurality of computers is transmitted to the particular one of the plurality of computers to which the internet relay chat messages were directed, the monitoring node further configured to receive the internet relay chat messages transmitted to the plurality of computers and to perform traffic monitoring to detect the controller based on the traffic monitoring and a MultiProtocol Label Switching label associated with the traffic, the monitoring node further configured to store data corresponding to a plurality of previous traces generating by a previously targeted computer and to identify a plurality of zombie computers based on a comparison of the plurality of previous traces with the traces of the attacked computer.

9. The system of claim 8 wherein the monitoring node further comprises a database storing application level traces of all traffic to the attacked computer.

* * * * *